United States Patent [19]
Rutty et al.

[11] 4,411,072
[45] Oct. 25, 1983

[54] VARIABLE STIFFNESS RULE BLADE, RULE EMPLOYING SAME, AND METHOD OF MAKING SAME

[75] Inventors: Edward C. Rutty, Portland; Carl C. Stoutenberg, Burlington, both of Conn.

[73] Assignee: The Stanley Works, New Britain, Conn.

[21] Appl. No.: 430,676

[22] Filed: Sep. 30, 1982

[51] Int. Cl.³ ............................................. G01B 3/10
[52] U.S. Cl. ...................................... 33/138; 242/84.8
[58] Field of Search ........................... 33/138, 137 R; 242/84.8

[56] References Cited

U.S. PATENT DOCUMENTS

| | | | |
|---|---|---|---|
| 950,581 | 3/1910 | Tracy | 33/137 R |
| 1,730,199 | 10/1929 | Farrand | 242/84.8 |
| 2,050,941 | 8/1936 | Farrand | 33/137 |
| 2,319,724 | 5/1943 | Dinhofer | 33/137 |
| 2,410,420 | 11/1946 | Bennett | 15/236 |
| 2,956,795 | 10/1960 | Foster | 33/138 |

FOREIGN PATENT DOCUMENTS

| | | |
|---|---|---|
| 9823 | 4/1980 | European Pat. Off. |
| 104305 | 7/1899 | Fed. Rep. of Germany |
| 2902882 | 1/1979 | Fed. Rep. of Germany |
| 1193809 | 3/1958 | France |

Primary Examiner—Willis Little

[57] ABSTRACT

A coilable measuring blade for coilable rules has a concavo-convex cross section which has a first portion wherein the length of the arc gradually decreases and the height of the cross section gradually increases to provide greater standout length. The inner or second portion of the blade also has a concavo-convex cross section with a relatively large radius and relatively shallow height. The blade may also have an outer terminal portion of greater height to require its deflection as it enters the rule casing and thereby provide reduction of the speed with which the blade is being retracted into the casing.

20 Claims, 13 Drawing Figures

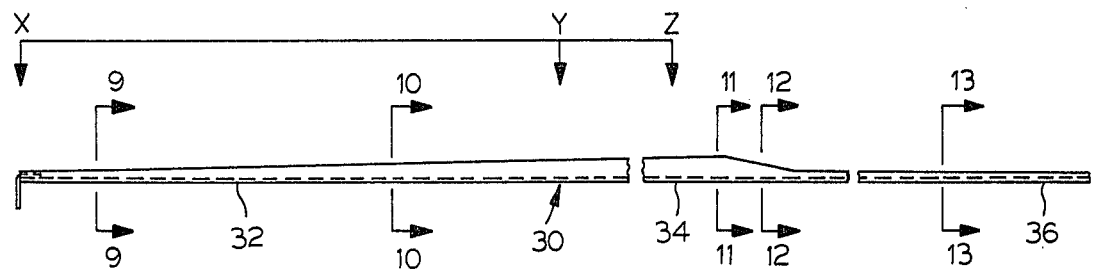
FIG. 8
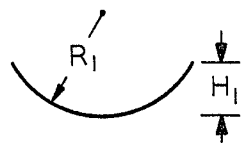 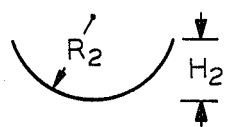 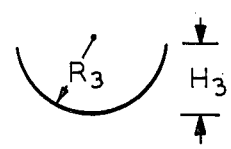
FIG. 9  FIG. 10  FIG. 11
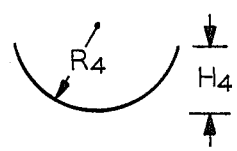 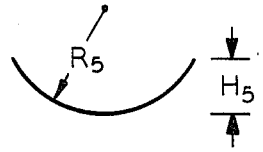
FIG. 12  FIG. 13

VARIABLE STIFFNESS RULE BLADE, RULE EMPLOYING SAME, AND METHOD OF MAKING SAME

BACKGROUND OF THE INVENTION

The present invention relates to coilable rules and more particularly to such rules employing coilable metal blades with greater standout length when unsupported as extended from the casing.

Coilable metal rules are widely used and frequently employ a concavo-convex cross section or other cross sectional configuration which will stiffen the blade so that the user may singlehandedly bridge a distance with the blade tip extended in a straight line. This enables the user to bridge doorways, shaftways, excavations and the like with the unsupported blade. It is known that the degree of curvature or cross section will influence and substantially determine the standout length (the length of the blade which can be extended unsupported without collapsing at the support portion) or breakpoint (the point at which the unsupported blade will collapse) for a rule of any particular width, thickness and metal characteristics.

Such blades are generally used in power returnable coilable rules that include a coiled spring which has the effect of retracting the extended blade into the rule housing or casing wherein it coils about the reel in its retracted position. It will be appreciated that the concavo-convex cross section of the blade is flattened as it is coiled within the rule casing, whether by manual action or by the retracting effect of such a power return spring. The stiffer the blade, the more spring power required to effect such flattening of the blade upon retraction.

As is also well known, blades employing such a concavo-convex cross section generally must be heat treated to achieve the desired flexural characteristics to withstand the repeated flattening operation that occurs in the coiling of the blade within the rule casing. It has been necessary to balance the advantages to be gained by increasing the depth of curvature of the blade for increased length of blade standout with the power requirements for the spring to effect its retraction and also with the life characteristics resulting from repeated deflection into the flattened condition when the blade is coiled.

Moreover, because the extended blade will assume the concavo-convex cross section, the indicia which are imprinted thereon become more difficult to read when the arcuate cross secton becomes steeper. Lastly, when there is a very high cross curve or deep cross section, there is a stress point at the point where the blade does buckle when fully extended, which, over repeated usage, may cause a stress fracture.

Because of the necessity for balancing these various factors, the range of standout length for commerically available widths of concavo-convex blades is set forth in the following table:

| BLADE WIDTH, INCHES | STANDOUT LENGTH, INCHES |
| --- | --- |
| ¼ | 12–16 |
| ½ | 35–43 |
| ¾ | 55–73 |
| 1 | 86–97 |

Various cross sections have been used for the concavo-convex blade construction. Generally, the cross section is a segment of a circular arc or a segment of a circular arc with straight segments at its ends (e.g., rectilinear portions which are tangential to the center arcuate segment). In this manner the concavo-convex cross section will not have any sharp bends which would produce points where the blade will be overstressed during the repeated flattening operation, and the amount of force required to flatten the curve is more readily available from economically utilizable power return springs.

In our copending application filed concurrently herewith, Ser. No. 430,730, there are described and claimed blades wherein there is provided an intermediate portion of stiffer cross secton to increase the standout length and initial and inner portions of less stiffness.

It is an object of the present invention to provide a novel coilable metal blade for a rule which provides greater standout length.

It is also an object to provide such a blade which can be readily and economically fabricated and which will enjoy long life.

Another object is to provide such a blade which will slow the rate of retraction as the blade is almost fully retracted into the casing.

A further object is to provide a novel rule employing such a blade and which may be fabricated readily and relatively economically.

Yet another object is to provide a novel method for fabricating such coilable metal rule blades offering enhanced or great standout.

SUMMARY OF THE INVENTION

It has now been found that the foregoing and related objects may be readily attained in a coilable rule blade providing greater standout length and comprising an elongated strip of resiliently deflectable metal having a substantially uniform width in its closed flattened state and, in its uncoiled state, a concavo-convex cross section along substantially its entire length. This concavo-convex cross section has a central segment of acruate configuration defined by a radius R and has a depth H.

The blade has a first portion adjacent one end thereof in which the radius R of the central segment of the cross section gradually decreases and the depth H of the cross section gradually increases from values $R_1$ and $H_1$ respectively adjacent one end towards the other end to values $R_2$ and $H_2$ respectively at a point beyond the normal breakpoint of a blade of that width and having a cross section approximating that of the values of $\frac{1}{2}(R_1+R_2)$ and $\frac{1}{2}(H_1+H_2)$ respectively. The radius thereafter increases and the depth of cross section decreases to values of $R_3$ and $H_3$ respectively; and the second portion of the blade has a cross section in which the radius $R_3$ and depth $H_3$ are substantially uniform over the length thereof and which extends to adjacent said other end of said blade.

In its preferred form, the entire cross section of each of the blade portions is defined by a single continuous arc of the respective radius, or the cross section of each of the blade portions includes substantially rectilinear segments tangential to the ends of the central arcuate segment.

The radius R of the arcuate segment of the first portion may decrease in length from $R_1$ to $R_2$ and the depth H increase from the $H_1$ to $H_2$ towards the second portion of the blade at a substantially uniform rate over substantially the entire length of the first portion, or these dimensions may increase in a series of increments. Moreover, the radius R of the first portion most desirably increases, and the depth H correspondingly decreases, at a rapid rate adjacent the second portion so as to blend thereinto.

In one embodiment, the blade also has a terminal portion adjacent its one or outer end which has a radius $R_4$ for its arcuate segment which is smaller than the radius $R_1$, and it correspondingly has a depth $H_4$ greater than the depth $H_1$, of the first portion of the blade.

The blade is used in a coilable rule assembly which includes a casing having end walls and a peripheral sidewall defining a chamber therebetween and in which the sidewall has an exit aperture therethrough. As is conventional, the coiled rule blade in the chamber has one end extending outwardly of the casing aperture. The rule assembly will generally include a coiled power return spring within a reel in the chamber which has its outer end engaged with the inner end of the blade which is coiled about the reel.

In one embodiment, the rule casing cooperates with a blade having a deeper cross section for its outer end portion and has an exit aperture which is of a depth $H_5$ less than the depth $H_4$ of the terminal portion of the blade so as to cause deflection thereof as it passes therethrough to reduce the rate of retraction of the blade under the action of the power return spring.

In making the coilable rule blade, a length of resiliently deflectable metal strip having a width W is provided, and the blade is formed to provide a concavo-convex cross section having a central segment of arcuate configuration. The forming operation produces a first portion of the blade length in which the radius R of the central segment of the cross section gradually decreases and the depth H of the cross section gradually increases from values $R_1$ and $H_1$ respectively adjacent one end towards the other end to values of $R_2$ and $H_2$ respectively at a point beyond the normal breakpoint of a blade of that width and having a cross section approximating that of the values of $\frac{1}{2}(R_1+R_2)$ and $\frac{1}{2}(H_1+H_2)$ respectively. The forming operation produces a section in which the radius thereafter increases and the depth of cross section decreases to values of $R_3$ and $H_3$ respectively, and it produces a second portion in which the radius $R_3$ and depth of cross section $H_3$ are substantially uniform over the length thereof and which extends to adjacent said other end of said blade. These values are respectively substantially greater and lesser than the values of $R_2$ and $H_2$.

The forming may be by a cold forming technique in which the length of strip is hardened and tempered and thereafter roll formed to shape the several portions of the length into the desired cross section, or by a hot forming technique in which the heated blade is roll formed, quenched and tempered. Conveniently, the several portions of the length of metal strip are formed initially in a roll forming operation in which the length is passed through a series of roll forming dies providing a constant configuration for the several portions, and thereafter the first portion is further formed to the desired configuration.

If so desired, a section of the length of strip at the end of the first portion which is spaced from the second portion may be formed into a concavo-convex cross section having a central segment of deep arcuate cross section defined by a radius $R_4$ and a depth $H_4$ respectively lesser and greater than $R_1$ and $H_1$.

BRIEF DESCRIPTION OF THE DRAWINGS

FIG. 8 is a fragmentary side elevational view of the blade showing the several portions thereof; and FIGS. 9-13 are sectional views thereof along the section lines 9—9, 10—10, 11—11, 12—12 and 13—13 of FIG. 8.

DETAILED DESCRIPTION OF THE ILLUSTRATED EMBODIMENTS

Figure 1:
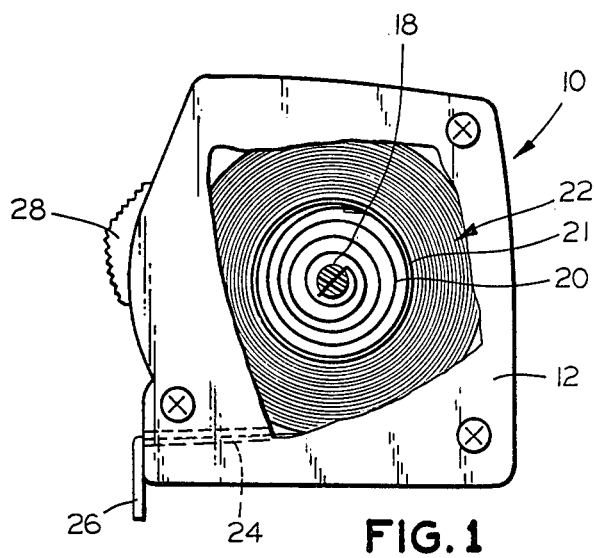
FIG. 1 is a elevational view of a power returnable coilable rule embodying the present invention with a portion of the housing end wall broken away to reveal internal construction.
Figure 2:
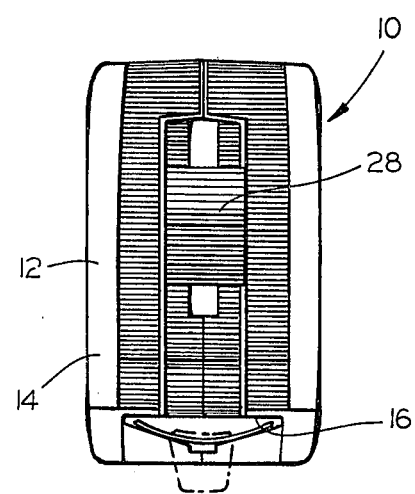
FIG. 2 is a side elevational view thereof with the end hook in phantom line for clarity of illustration of the exit aperture in the housing.
Figure 3:
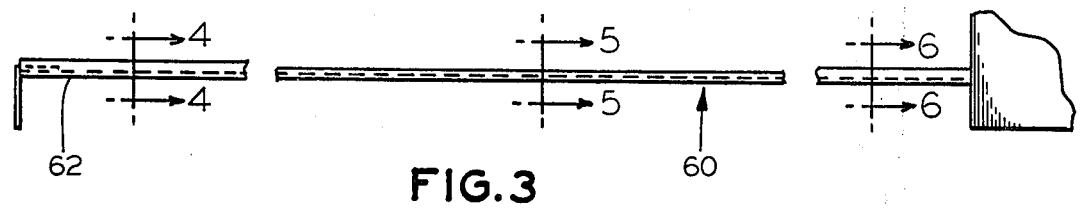
FIG. 3 is a fragmentary elevational view of the rule with the blade partially extended from the housing.

Turning first to FIGS. 1 and 2, therein illustrated is a power returnable coilable blade embodying the present invention and having a housing generally designated by the numeral 10 with end walls 12 and a peripheral sidewall 14 extending therebetween and in which there is provided an exit aperture 16. The walls 12, 14 define an internal cavity in which there is a hub 18, and a coiled power return spring 20 thereabout which has its outer end secured to the inner end of the blade generally designated by the numeral 22 and which is coiled about the reel 21. The terminal portion of the blade 22 extends through the passage 24 and outwardly of the exit aperture 16. As is conventional, a hook 26 is provided at its end which abuts the sidewall 14 about the aperture 16 and limits movement of the blade 20 inwardly of the housing 10.

Also shown is a blade locking lever 28 which cooperates with mechanism (not shown) within the casing 10 to hold the blade 20 in an extended position as originally illustrated and described in Robert F. West U.S. Pat. No. 3,214,836 granted Nov. 2, 1965.

Turning next to FIGS. 8-13, therein fragmentarily illustrated are the several portions of an uncoiled blade generally designated by the numeral 30 and which is of substantially uniform width in its flattened or coiled condition and of concavo-convex cross section in its relaxed or extended position. The blade 30 has an arcuate cross section defined by a radius R, and it has a depth or height H. The cross section of the outer or first portion 32 is defined by a radius which decreases at a substantially uniform rate from a radius $R_1$ adjacent its outer end to a length $R_3$. As a result, the height of the cross section increases from $H_1$ to $H_3$ at the section 34 of maximum stiffness. Shortly after the section 34 where the depth $H_3$ is greatest, the radius rapidly increases and the depth rapidly decreases. This rapid rate of change can be seen in the section 12—12 where the values have changed to $R_4$ and $H_4$ respectively, within a short distance.

This rapid rate of change terminates at the beginning of the second portion 36 of the blade 30 wherein the concavo-convex cross section has a substantially uniform radius $R_5$ and a correspondingly uniform height or depth $H_5$, thus providing substantially less stiffness.

Diagrammatically indicated by the dimension line X-Y is the normal standout length for the blade were it to have a uniform cross section equal to the average radius ½ ($R_1+R_3$) and the average depth ½ ($H_1+H_4$) of the first portion 32 throughout that length. As seen, the section 34 of greatest depth is spaced well beyond the point Y. As a result of the increased stiffness provided by the stiffening cross section of the first portion 30 in accordance with the present invention, the standout length for the extended blade is signified by the dimension line X-Z.

Figure 4:
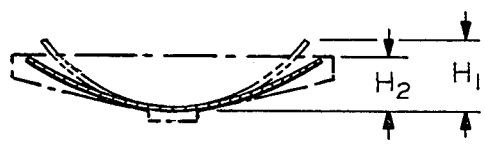
FIG 4 is a partially diagrammatic cross sectional view of the blade at the line 4—4 of FIG. 3 with the housing exit aperture shown in phantom line and with the blade cross section shown in full line as deflected for passage therethrough and in phantom line before such deflection.
Figure 5:
FIG. 5 is a similar diagrammatic sectional view of the blade at the line 5—5 in the housing exit aperture.
Figure 6:
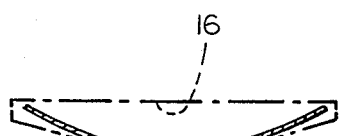
FIG. 6 is a similar diagrammatic sectional view of the blade at line 6—6 in the housing exit aperture.

The braking action of the blade embodiment 60 providing a terminal portion 62 with a deep cross section $H_1$ is illustrated in FIGS. 3-6. As seen in FIG. 4, the height $H_1$ of the relaxed outer or terminal section 62 is greater than the depth $H_2$ of the exit aperture while that of the adjacent first portion as shown in FIG. 5 and that of the second portion as shown in FIG. 6 are less than that of the depth $H_2$. As a result, when the blade 60 is being retracted by the return spring, the terminal portion 62 must be deflected from the phantom line showing to the solid line showing in FIG. 4. The friction and spring power consumption required for such deflection slows the rate of retraction under action of the power return spring to provide a braking action, thus reducing the impact force on the hook when it abuts the rule casing.

Figure 7:
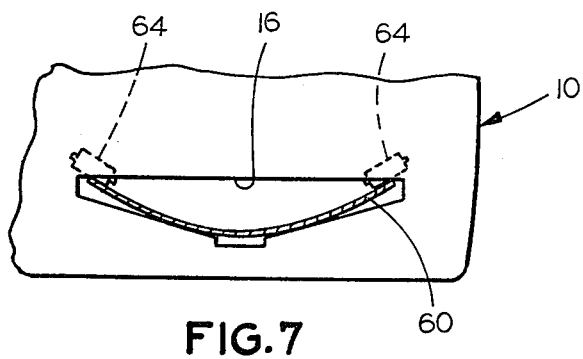
FIG. 7 is a fragmentary side elevational view of another embodiment of rule using guide rollers in the rule housing for the blade adjacent the exit aperture and with the blade shown in section.

Turning now to FIG. 7, the rule of this embodiment includes a pair of rollers 64 inside the housing 10 adjacent the upper side margins of the exit aperture 16 so that the terminal portion 62 of the blade 60 is guided thereby and more readily deflected with less friction between the blade 60 and the wall of the casing 10 about the exit aperture 16. This improves the efficiency of the return spring when such braking action is desired, particularly when only a short length of the blade 60 has been extended.

As has been previously indicated, the cross section of the blades of the present invention may comprise a continuous circular arc defined by a single radius, a curvilinear arc defined by a central arcuate segment of one radius and outer arcuate segments of another radius, or a composite of a central arcuate segment and rectilinear segments tangential to the ends of the arcuate segments. From convenience and life standpoints, continuous circular arc and arc/tangent composite configurations are preferred.

The increase in curvature and depth in the first portion may be effected by a gradual, uniform increase to a point beyond the new breakpoint, or by a series of discrete incremental steps in radius change. From cost and manufacturing standpoints, a gradual increase is desirable from the standpoint of minimizing the overall increase in stiffness and attendant increase in spring power required to effect flattening during retraction. The maximum depth of cross section may extend uniformly over a limited length of the blade (generally ½-2 feet) encompassing the new breakpoint and thereafter rapidly diminish the cross section to that of the second portion.

The length of the radii in, and the heights of, the concavo-convex cross section, will vary with the metal employed, the width of the strip, the physical characteristics of the metal, etc. Such radii and heights will be readily apparent to those having ordinary skill in this art with the teaching of this specification before them. It will be appreciated that excessive stiffness in cross section is to be avoided because of its detrimental effect upon the return spring power requirements and upon life of the blade. Accordingly, the first portion should not be overly extended in length but should end at about 105-120 percent of the enhanced standout length. Moreover, if so desired, the gradual increase may be delayed for a short length from the outer end of the blade so that the increased stiffness is being provided as the weight of the blade becomes sufficient to produce bending. This deferred length will normally be about 1-3 feet from the 0 point or outer end of the blade.

The methods employed for forming the blade will generally involve a hot forming operation to effect the desired cross section followed by tempering, or a cold forming operation followed by stress relieving. Roll dies may be used in conjunction with elongated strip intended to be severed into the desired lengths for the individual blades to effect the variation in cross section along repeating lengths of the strip, although brake forming of the severed lengths may also be employed. If so desired, a substantially uniform minimum curve cross section may be provided along the entire length of the strip, which cross section corresponds to that of the second portion. The strip may then be severed into the desired blade lengths, and the severed blade lengths are then further formed to provide the increasing curvature in the first portion, either by a brake forming die and mandrel assembly or by a roller die assembly. Brake forming of the severed lengths which have been previously uniformly formed has been found to be readily added to the existing manufacturing operations.

Although the increased depth of cross section in the outer terminal section illustrated in one of the embodiments will have the effect of increasing the frictional resistance to retraction and thus augment braking action, it will be appreciated that it also increases the power requirement for retracting the extended blade if the length extended comprises only such terminal section. Thus, some manual assistance may be necessary to augment the spring force. To some extent, this problem may be reduced by employing friction reducing rollers inside the case adjacent the exit aperture and by using a low friction synthetic resin insert to define the exit aperture as shown in the illustrated embodiment. The length of this braking section should not exceed about eighteen inches and preferably comprises the first 6-12 inches of the blade length. Conveniently, its arcuate cross section is of a depth about 5-15 percent greater than the height of the exit aperture in the casing.

Example One

Exemplary of the method of making such blades is the following process used for the generation of a 1 inch wide blade having increased standout length.

Steel strip of SAE 1095 alloy is spheroidized annealed and lightly rolled to prevent kinking, and has a Rockwell B hardness of 97-99. The steel strip has a width of one inch and a thickness of 0.0045 inch (+ or −0.0003 inch).

The annealed strip is then heated to a temperature of about 1550° Fahrenheit in a continuous strip form and is passed through forming dies which form the strip into the desired cross section which is uniform along its length. Thereafter, the strip is quenched and cooled to fix the configuration so generated, passed through a furnace wherein its temperature is raised to about 700° Fahrenheit to effect tempering and relieve brittleness, and thereafter cooled. At this time, the strip is found to have a cross section with an arcuate center section defined by a radius of 0.786 inch and tangential rectilinear segments of 0.168 inch in length and which cross section extends throughout the length thereof. The total height of the cross section is 0.138 inch.

The strip is then coated with a primer paint which is baked, and the strip is flattened by backbending and imprinted with the indicia in repeating patterns in accordance with the desired lengths thereof. Preferably, the imprinted blade is then laminated in a polyethylene terephthalate film.

The printed strip is then passed through a cutoff station where the precise lengths are severed and at which the first portion of the severed length is simultaneously cold formed into the desired cross section. This forming is performed in two steps in a press brake die which further forms the portion commencing at 24 inches from the 0 inch point of the blade and ending at 118 inches. The cut off length is first further formed in one stroke along one side of the center line, and then along the other side of the center line in the second stroke, to produce a cross section in the first portion where the radius of the arcuate segment decreases at a uniform rate from 0.786 inch to 0.226 inch and the height increases from 0.138 inch to 0.226 inch at a point 108 inches from the 0 inch mark. The radius and depth are constant at these values from 108 to 116 inches, and then a rapid rate of change is employed over a 2 inch distance (at the 116–118 inch length) to effect the transition to the original radius of 0.786 inch and height of 0.138 inch. The length of the rectilinear segments is unchanged. Following this cold forming step to augment the curve in the intermediate section, the cut off length is stress relievd by front bending it about a roll and then back bending.

Following the stiffening operation, the cut off blade is found to have a standout length of about 112 inches as compared to a standout length of about 60 inches for blades of uniform cross section corresponding to an average of the beginning and ending radii of the internal portion.

Thus, it can be seen from the foregoing detailed description and the attached drawings that the blades of the present invention provide rule blades having increased standout length and that they may be fabricated readily and relatively economically. Moreover, they enjoy relatively long life in operation and may be utilized in conventional power returnable rules. In accordance with one aspect, the blades are also provided with a braking section adjacent their outer end to reduce the impact upon the blade hook or the like.

Having thus described the invention, we claim:

1. A coilable rule blade having greater standout length comprising an elongated strip of resiliently deflectable metal having a substantially uniform width in its coiled flattened state and, in its uncoiled state, a concavo-convex cross section along substantially its entire length, said cross section having a central segment of arcuate configuration defined by a radius R and having a depth H, said blade having a first portion in which the radius R of the central segment of the cross section gradually decreases and the depth H of the cross section gradually increases from values $R_1$ and $H_1$ respectively adjacent one end to values of $R_2$ and $H_2$ respectively at a point beyond the normal breakpoint of a blade of that width and having a cross section approximating that of the value of $\frac{1}{2}(R_1+R_2)$ and $\frac{1}{2}(H_1+H_2)$ respectively, said radius thereafter increasing and said depth of cross section decreasing towards the other end of the blade to values of $R_3$ and $H_3$ respectively; and a second portion in which the radius $R_3$ and depth of cross section $H_3$ are substantially uniform over the length thereof and which extends to adjacent said other end of said blade.

2. The coilable rule blade of claim 1 wherein the entire cross section of each of said portions is defined by a single continuous arc of the respective radius.

3. The coilable rule blade of claim 1 wherein the cross section of each of said portions includes substantially rectilinear segments tangential to the ends of said central arcuate segment.

4. The blade in accordance with claim 1 wherein said decrease in radius and said increase in depth of cross section in said first portion of said blade are at a substantially uniform rate along the length thereof.

5. The blade in accordance with claim 1 wherein said decrease in radius and said increase in depth of cross section in said first portion of said blade are in incremental steps along the length thereof.

6. The blade in accordance with claim 1 wherein said increase in radius and decrease in depth of cross section in said first portion of said blade adjacent said second portion thereof are at a substantially uniform rate along the length thereof and such rate is substantially greater than the rate of decrease in radius and increase in depth of cross section in the major section of said first portion.

7. The coilable rule blade of claim 1 wherein said blade has a terminal portion adjacent said one end with a radius $R_3$ for its arcuate segment which is smaller than the radius $R_1$, and with a depth $H_3$ greater than the depth $H_1$, of said first portion of said blade.

8. A coilable rule comprising
A. a casing having end walls and a peripheral sidewall defining a chamber therebetween, said sidewall having an exit aperture therethrough; and
B. a coiled rule blade in said chamber having one end extending outwardly of said casing aperture, said blade comprising an elongated strip of resiliently deflectable metal having a substantially uniform width in its coiled flattened state and, in its uncoiled state, a concavo-convex cross section along substantially its entire length, said cross section having a central segment of arcuate configuration defined by a radius R and having a depth H, said blade having a first portion in which the radius R of the central segment of the cross section gradually decreases and the depth H of the cross section gradually increases from values R1 and $H_1$ respectively adjacent one end to values of $R_1$ and $H_2$ respectively at a point beyond the normal breakpoint of a blade of that width and having a cross section approximating that of the values of $\frac{1}{2}(R_1+R_2)$ and $\frac{1}{2}(H_1+H_2)$ respectively, said radius thereafter increasing and said depth of cross section decreasing towards the other end of said blade to values of $R_3$ and $H_3$ respectively; and a second portion in which the radius $R_3$ *l and depth of cross section*

$H_3$ are substantially uniform over the length thereof and which extends to adjacent said other end of said blade.

9. The coilable rule of claim 8 including a coiled power return spring within a reel in said chamber having its outer end engaged with the inner end of said blade which is coiled about said reel.

10. The coilable rule of claim 8 wherein the entire concavo-convex cross section of each of said blade portions is defined by a single continuous arc of the respective radius.

11. The coilable rule of claim 8 wherein the cross section of each of said blade portions includes substantially rectilinear segments tangential to the ends of said central arcuate segment.

12. The coilable rule of claim 8 wherein said decrease in radius and said increase in depth of cross section in said first portion of said blade are at a substantially uniform rate along the length thereof.

13. The coilable rule of claim 8 wherein said decrease in radius and said increase in depth of cross section in said first portion of said blade are in incremental steps along the length thereof.

14. The coilable rule of claim 8 wherein said increase in radius and decrease in depth of cross section in said first portion of said blade against said second portion thereof are at a substantially uniform rate along the length thereof and such rate is substantially greater than the rate of decrease in radius and increase in depth of cross section in the major section of said first portion.

15. The coilable rule of claim 8 wherein said blade has a terminal portion adjacent said one end with a radius $R_3$ for its arcuate segment which is smaller than the radius $R_1$, and with a depth H3 greater than the depth $H_1$, of said first portion of said blade.

16. The coilable rule of claim 15 wherein said exit aperture is of a depth $H_4$ less than the depth $H_3$ of said terminal portion of said blade so as to cause deflection thereof as it passes therethrough to reduce the rate of retraction of said blade under the action of said power return spring.

17. In a method for making a coilable rule blade, the steps comprising
   A. providing a length of resiliently deflectable metal strip having a width W;
   B. forming a first portion of said length into a concavo-convex cross section having a central segment of arcuate configuration defined by a radius r and having an overall depth H and in which the radius R of the central segment of the cross section gradually decreases and the depth H of the cross section gradually increases from values $R_1$ and $H_1$ respectively adjacent one end to values of $R_2$ and $H_2$ respectively at a point beyond the normal breakpoint of a blade of that width and having a cross section approximating that of the values of $\frac{1}{2}(R_1+R_2)$ and $\frac{1}{2}(H_1+H_2)$ respectively, said radius thereafter increasing and said depth of cross section decreasing towards the other end of said blade to values of $R_3$ and $H_3$ respectively; and a second portion of concavo-convex cross section in which the radius $R_3$ and depth of cross section $H_3$ are substantially uniform over the length thereof and which extends to adjacent said other end of said blade.

18. The blade making method of claim 17 wherein said forming is by a cold forming technique in which the length is hardened and tempered and thereafter roll formed to shape the several portions of the length into the desired cross section.

19. The blade making method of claim 17 wherein said forming includes a hot forming step in which the strip is initially heated and formed into a uniform concavo-convex cross section along its length having a radius $R_3$ and a height $H_3$, quenched and tempered, and said first portion is thereafter further formed and stress relieved.

20. The blade making method of claim 17 additionally including the step of forming a section of said length at the end of said first portion spaced from said second portion into a concavo-convex cross section having a central segment of arcuate cross section defined by a radius $R_3$ and an overall depth $H_3$ respectively greater and lesser than $R_1$ and $H_1$.

* * * * *

UNITED STATES PATENT AND TRADEMARK OFFICE
CERTIFICATE OF CORRECTION

PATENT NO. : 4,411,072

DATED : October 25, 1983

INVENTOR(S) : Edward C. Rutty et al

It is certified that error appears in the above—identified patent and that said Letters Patent is hereby corrected as shown below:

Column 8, line 59, "R1" should be -- $R_1$ --;

Column 8, line 60, "$R_1$" should be -- $R_2$ --;

Column 9, line 37 "H3" should be -- $H_3$ --.

Signed and Sealed this

Seventh Day of February 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,411,072
DATED : October 25, 1983
INVENTOR(S) : Edward C. Rutty et al It is certified that error appears in the above–identified patent and that said Letters Patent are hereby corrected as shown below:

Column 2, line 39, "closed" should be -- coiled --;

Signed and Sealed this

Nineteenth Day of March 1985

[SEAL]

Attest:

DONALD J. QUIGG

Attesting Officer

Acting Commissioner of Patents and Trademarks